United States Patent
Pinkney et al.

(10) Patent No.: US 9,727,627 B2
(45) Date of Patent: *Aug. 8, 2017

(54) FIXED CONTENT STORAGE WITHIN A PARTITIONED CONTENT PLATFORM, WITH REPLICATION

(71) Applicant: Hitachi Data Systems Corporation, Santa Clara, CA (US)

(72) Inventors: David P. Pinkney, Andover, MA (US); Matthew M. McDonald, Quincy, MA (US); Benjamin J. Isherwood, Tewksbury, MA (US)

(73) Assignee: HITACHI DATA SYSTEMS CORPORATION, Santa Clara, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/020,963

(22) Filed: Sep. 9, 2013

(65) Prior Publication Data

US 2014/0108346 A1  Apr. 17, 2014

Related U.S. Application Data

(63) Continuation of application No. 12/609,869, filed on Oct. 30, 2009, now Pat. No. 8,533,155.

(51) Int. Cl.
 *G06F 17/30* (2006.01)
 *G06F 11/20* (2006.01)

(52) U.S. Cl.
 CPC .... *G06F 17/30584* (2013.01); *G06F 11/2094* (2013.01); *G06F 17/30212* (2013.01)

(58) Field of Classification Search
 None
 See application file for complete search history.

(56) References Cited

U.S. PATENT DOCUMENTS

| | | | |
|---|---|---|---|
| 7,240,114 B2* | 7/2007 | Karamanolis | G06F 17/30067 370/254 |
| 7,779,404 B2* | 8/2010 | Movassaghi | H04L 41/0813 717/168 |

(Continued)

FOREIGN PATENT DOCUMENTS

WO  2008058230  5/2008

OTHER PUBLICATIONS

Extended European Search Report received in corresponding European Application No. 10827558.7 dated Aug. 11, 2016.

*Primary Examiner* — Belix M Ortiz Ditren
(74) *Attorney, Agent, or Firm* — Mattingly & Malur, PC

(57) ABSTRACT

A content platform cluster that comprises an array of nodes is logically partitioned. Using a web-based interface, an administrator defines "tenants" within the cluster, wherein a tenant has a set of attributes: namespaces, administrative accounts, data access accounts, and a permission mask. A namespace is a logical partition of the cluster that serves as a collection of objects typically associated with at least one defined application. Each namespace has a private file system with respect to other namespaces. This approach enables a user to segregate cluster data into logical partitions. Tenant information, including all associated namespaces, in the cluster (the "source cluster") is replicated to at least one target cluster over a replication link. Preferably, replication is available for multiple tenants in the source cluster, and a replication algorithm ensures that a particular tenant can be added to the replication link without stalling the progress of other tenants.

24 Claims, 16 Drawing Sheets

(56) References Cited

U.S. PATENT DOCUMENTS

| | | | |
|---|---|---|---|
| 8,156,163 B1* | 4/2012 | Hamilton | H04L 67/1097 |
| | | | 707/812 |
| 2003/0191810 A1 | 10/2003 | Muhlestein et al. | |
| 2006/0007944 A1 | 1/2006 | Movassaghi et al. | |
| 2007/0038822 A1 | 2/2007 | Correl | |
| 2007/0179991 A1 | 8/2007 | Burnett et al. | |
| 2009/0006888 A1* | 1/2009 | Bernhard et al. | 714/6 |
| 2009/0210431 A1 | 8/2009 | Marinkovic et al. | |
| 2010/0241696 A1* | 9/2010 | Matoba | H04L 67/14 |
| | | | 709/203 |
| 2012/0173581 A1* | 7/2012 | Hartig | G06F 21/52 |
| | | | 707/781 |
| 2015/0296016 A1* | 10/2015 | Bennett, Jr. | H04L 63/104 |
| | | | 709/213 |

* cited by examiner

| Overview | Namespaces | Data Access Accounts | Services | Security | Monitoring |

Available space:
+ Create Namespace    1.8 TB ▭▭▭▭▭▭ of 4 TB

| | Name | Object Count | Alerts | Quota | |
|---|---|---|---|---|---|
| + | ☐ Namespace Name | 567,000 | | 1 GB ▭▭ of 2 GB | |
| + | ☐ Namespace Name | 1,345,000 | ☐☐ | 1.5 GB ▭▭ of 4 GB | |

| Overview | Policies | Services | Compliance | Protocols | Monitoring |

[A] Policies
900

[B] Retention [C]
Shredding
Versioning            904
                Use [Offset ▾] for default retention settings:

[E]
                Years:   Months:        Days:
                [    ]   [        ▾]    [        ▾]

Supporting                    [D] (Update Policy) (Cancel)
Graphic      902
                                    912

| + | ☐ Namespace Name ☐ | 0 | 0 GB ▭ of 4 GB |
| + | ■ Namespace Name | 2,000,512 | 3.2 GB ▭▭ of 4 GB |

Other Retention Methods:

Use [Fixed date ▾] for default retention settings:
[📅] [                        ]                              } 906

Use [Special values: ▾] for default retention settings:
[Deletion Allowed              ▾]                            } 908

Use [Retention Classes ▾] for default retention settings:
[Class Name                    ▾]                            } 910

FIXED CONTENT STORAGE WITHIN A PARTITIONED CONTENT PLATFORM, WITH REPLICATION

The subject matter herein includes material that is subject to copyright, and all such rights are reserved.

CROSS-REFERENCE TO RELATED APPLICATIONS

This application is related to application:

Ser. No. 11/638,252, filed Dec. 13, 2006, titled "Policy-based management of a redundant array of independent nodes;"

Ser. No. 11/675,224, filed Feb. 15, 2007, titled "Method for improving mean time to data loss (MTDL) in a fixed content distributed data storage;" and Ser. No. 11/936,317, filed Nov. 7, 2007, titled "Fast primary cluster recovery."

BACKGROUND

Technical Field

This disclosure relates generally to techniques for highly available, reliable, and persistent data storage in a distributed computer network.

Description of the Related Art

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

BRIEF SUMMARY

A content platform (or "cluster") that comprises a redundant array of independent nodes is logically partitioned. Using a web-based interface, an administrator defines one or more "tenants" within the cluster, wherein a tenant has a set of attributes: namespaces, administrative accounts, data access accounts, and a permission mask. A namespace is a logical partition of the cluster that serves as a collection of objects typically associated with at least one defined application. Each namespace has a private file system with respect to other namespaces. This approach enables a user to segregate cluster data into logical partitions. According to this disclosure, tenant information, including all associated namespaces, in the cluster (the "source cluster") is replicated to at least one target cluster over a replication link. Preferably, replication is available for multiple tenants in the source cluster, and a replication algorithm ensures that a particular tenant can be added to the replication link without stalling the progress of replicating data for other tenants.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

FIG. 8 illustrates a Namespace Overview container page for a given namespace;

FIG. 9 illustrates a Policies container page for the given namespace by which the administrator can configure a given policy;

DETAILED DESCRIPTION

Figure 1:
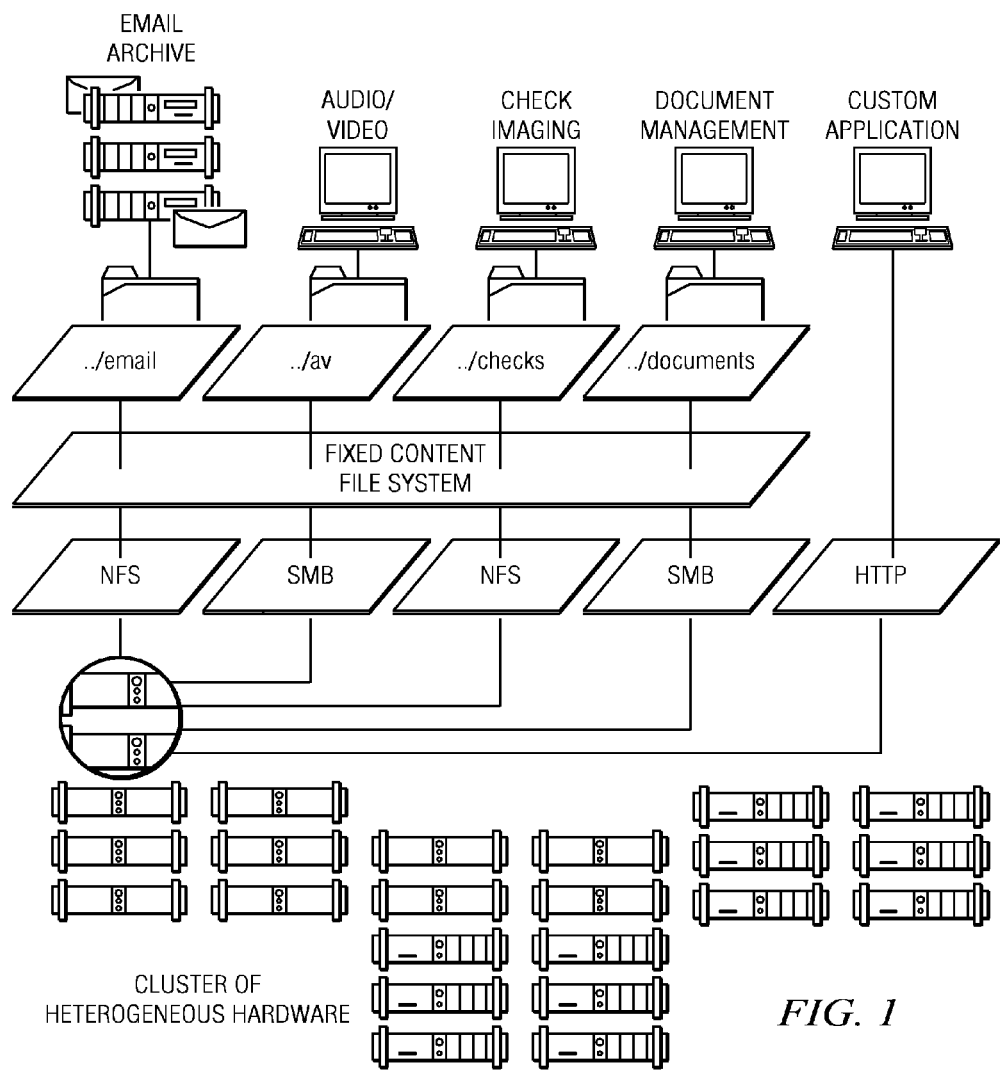
FIG. 1 is a simplified block diagram of a fixed content storage archive in which the subject matter may be implemented.

It is known to provide a scalable disk-based archival storage management system, preferably a system architecture based on a redundant array of independent nodes. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. In one illustrative embodiment, the software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
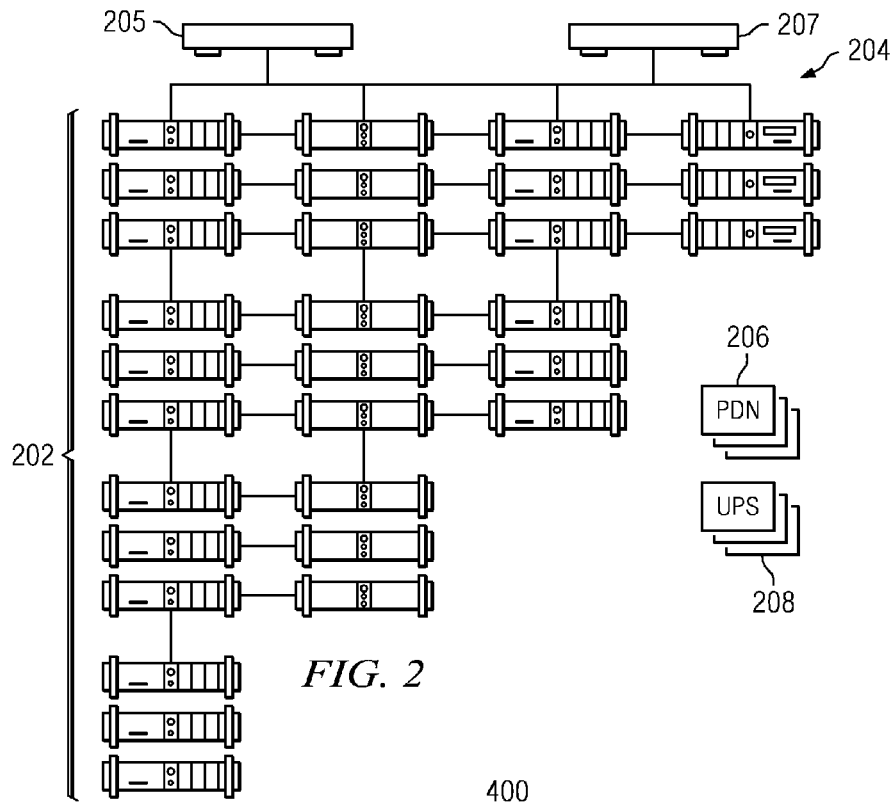
FIG. 2 is a simplified representation of a redundant array of independent nodes each of which is symmetric and supports an archive cluster application according to the disclosed subject matter.

As described in U.S. Pat. No. 7,155,466, a distributed software application executed on each node captures, preserves, manages, and retrieves digital assets. In an illustrated embodiment of FIG. 2, a physical boundary of an individual archive is referred to as a cluster. Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements. Preferably, data is replicated across the cluster so that the archive is always protected from device failure. If a disk or node fails, the cluster automatically fails over to other nodes in the cluster that maintain replicas of the same data.

An illustrative cluster preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enable peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used to protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the content platform may be carried out over any protocol (REST, HTTP, FTP, NFS, AFS, SMB, a Web service, or the like), via an API, or through any other known or later-developed access method, service, program or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include: NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For reliability, however, preferably each node runs an instance 300 of the distributed application (which may be the same instance, or substantially the same instance), which is comprised of several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. This operation is described in more detail below. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse local directory structures.

Figure 3:
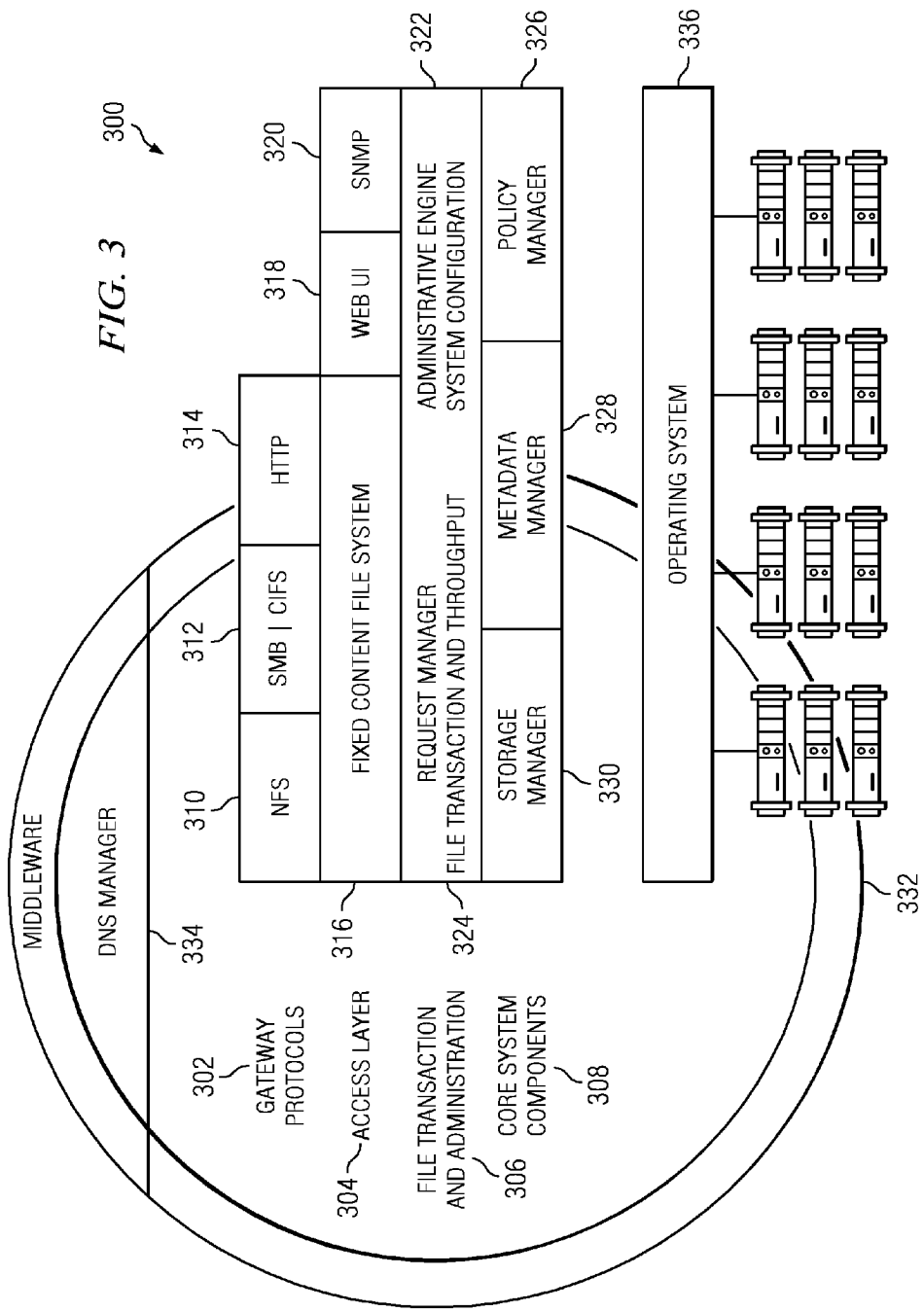
FIG. 3 is a high level representation of the various components of the archive cluster application executing on a given node.

As illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the application instance executes on a base operating system 336, such as Red Hat Linux 10.0. The communications middleware is any convenient distributed communication mechanism. Other components may include FUSE (Filesystem in USErspace), which may be used for the Fixed Content File System (FCFS) 316. The NFS gateway 310 may be implemented by Unfsd, which is a user space implementation of the standard nfsd Linux Kernel NFS driver. The database in each node may be implemented, for example, by PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file it generates a full path and file name for the representation for which it will be responsible. In a representative embodiment, each object to be stored on a storage manager is received as raw data to be stored, with the storage manager then adding its own metadata to the file as it stores it to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type) and EF Filename (external file filename). Storing this additional metadata with the internal file data provides for additional levels of protection. In particular, scavenging can create external file records in the database from the metadata stored in the internal files. Other services (sometimes referred to herein as "policies") can validate internal file hash against the internal file to validate that the internal file remains intact.

As noted above, internal files preferably are the "chunks" of data representing a portion of the original "file" in the archive object, and preferably they are placed on different nodes to achieve striping and protection blocks. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager also ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files.

The content platform also may implement a replication scheme such as described in Ser. No. 11/936,317, filed Nov. 7, 2007, the disclosure of which is incorporated by reference. According to that disclosure, a cluster recovery process is implemented across a set of distributed archives, where each individual archive is a storage cluster of preferably symmetric nodes. Each node of a cluster typically executes an instance of an application (as described above) that provides object-based storage of fixed content data and associated metadata. According to the storage method, an association or "link" between a first cluster and a second cluster is first established to facilitate replication. The first cluster is sometimes referred to as a "primary" whereas the "second" cluster is sometimes referred to as a "replica." Once the link is made, the first cluster's fixed content data and metadata are then replicated from the first cluster to the second cluster, preferably in a continuous manner. Upon a failure of the first cluster, however, a failover operation occurs, and clients of the first cluster are redirected to the second cluster. Upon repair or replacement of the first cluster (a "restore"), the repaired or replaced first cluster resumes authority for servicing the clients of the first cluster.

Figure 16:
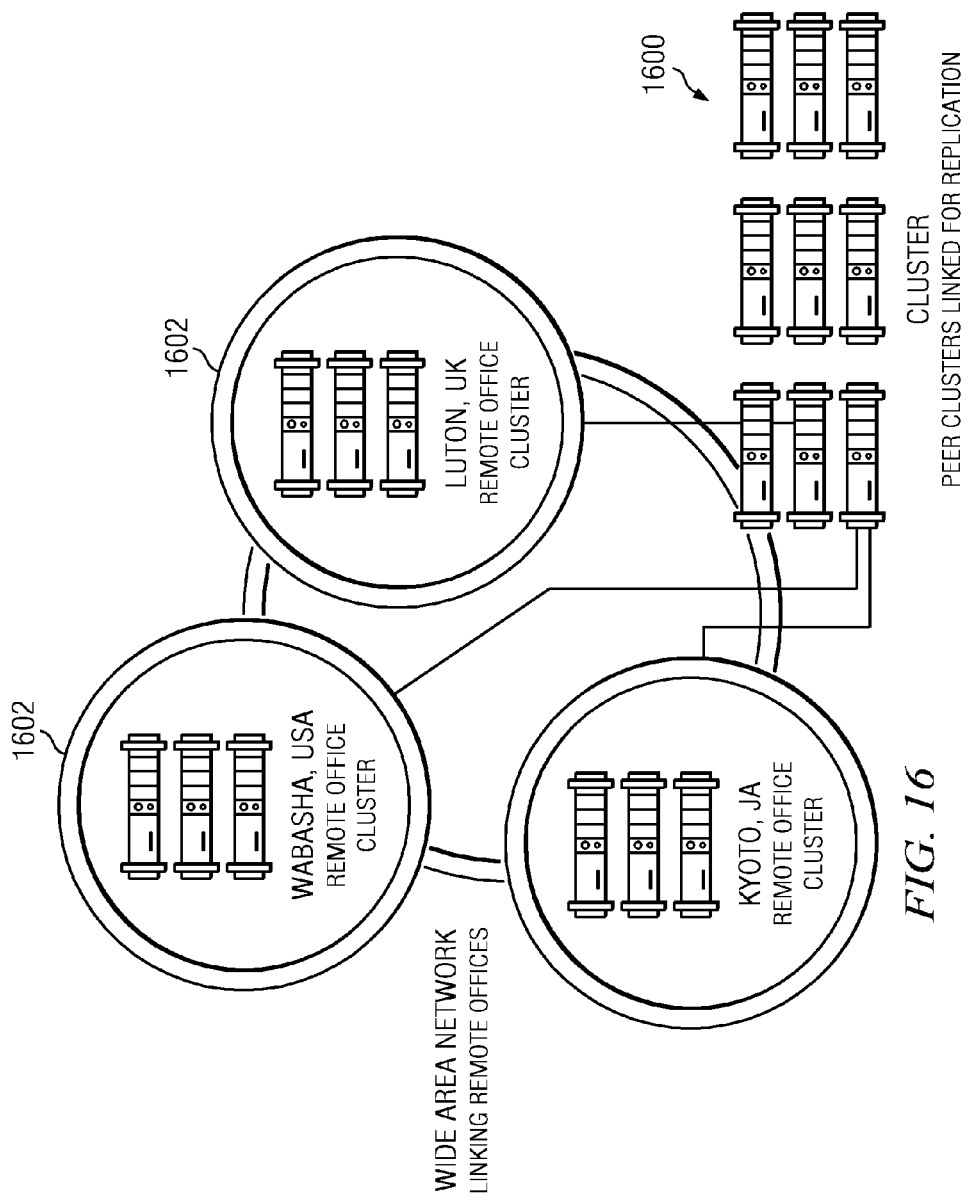
FIG. 16 illustrates how content is replicated to one or more remote archive sites to facilitate archival-based business continuity and/or disaster recovery.

FIG. 16 illustrates a Primary cluster 1600 together with a three Replica clusters 1602 (one located in Wabasha, USA, one located in Luton, UK, and one located in Kyoto, JP). Typically, clusters are located in different geographic locations, although this is not a limitation or requirement. Content is replicated (through replication process) from the primary cluster (PC) 1600 to each replica cluster (RC) 1602 enabling business continuity and disaster recovery. Thus, in the event of an outage, client applications can failover to the replica cluster minimizing system downtime. Restore functionality (a recovery process) provides rapid re-population of a new primary cluster, which may be either the re-built/re-stored original primary cluster, or an entirely new primary cluster.

Figure 17:
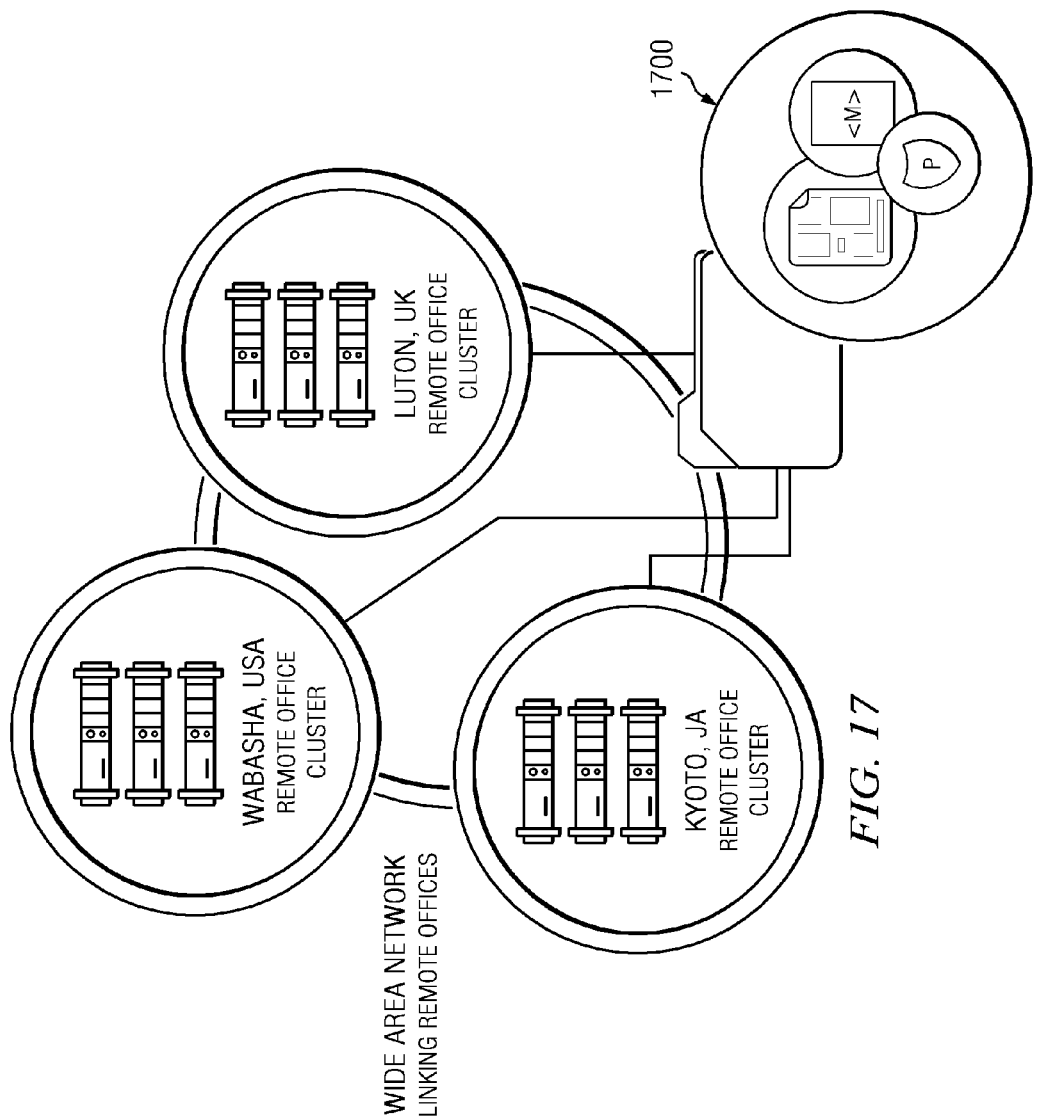
FIG. 17 represents how an administrator can create links between clusters to facilitate object level replication.

FIG. 17 illustrates an administration console graphical user interface (GUI) 1700 that allows creation of replication Links between clusters. As noted above, a link enables a source namespace to be replicated to a specified target cluster. The link may be configured with one or more options. Thus, a digital signature option may be selected to guarantee authenticity of the link. A compression option may be selected to enable data compression across the link to minimize WAN bandwidth requirements. An encryption option may be selected to enable encryption (e.g., SSL) to be used if the link needs to be secured, which may be the case if the link encompasses a public network (such as the Internet). In addition, a scheduling option enables selection of when replication should take place, and how aggressive the replication should be. These options preferably are each configured by the Administrator. Preferably, archive objects are replicated from a primary cluster to one or more replica clusters in a secure manner.

Preferably, replication is tracked at the object level, which includes fixed content data, metadata, and policy information (e.g., shredding attributes, and the like). The GUI may also expose metrics that include, for example, replication progress in terms of number of objects and capacity. Any archive may include a machine through which an Administrator can configure an archive for replication, recovery and fail-back.

A content platform such as described above may implement a data protection level (DPL) scheme such as described in Ser. No. 11/675,224, filed Feb. 15, 2007, the disclosure of which is incorporated by reference.

The above is a description of a known content platform or "cluster." The following describes how an enterprise (or other entity, such as a service provider) can partition such a cluster and use the cluster resources more effectively as the amount of user data to be stored increases.

Cluster Partitioning—Tenants and Namespaces

The following terminology applies to the subject matter that is now described:

Data Account (DA): an authenticated account that provides access to one or more namespaces. The account has a separate set of CRUD (create, read, update, and delete) privileges for each namespace that it can access.

Namespace (NS): a logical partition of the cluster. A namespace essentially serves as a collection of objects particular to at least one defined application. As will be described, each namespace has a private filesystem with respect to other namespaces. Moreover, access to one namespace does not grant a user access to another namespace. An archive may have an upper bound on the number of namespaces allowed on a single cluster (e.g., up to 100).

Authenticated Namespace (ANS): a namespace (preferably HTTP-only) that requires authenticated data access.

Default Namespace (dNS): a namespace for use with data that is ingested into the cluster in other than REST (Representational State Transfer), where REST is a lightweight protocol commonly used for exchanging structured data and type information on the Web. Further, even if an application uses the REST interface, if a namespace is not specified during authentication to the cluster, all data can be stored in the default namespace.

Tenant: a grouping of namespace(s) and possibly other subtenants.

Top-Level Tenant (TLT): a tenant which has no parent tenant, e.g. an enterprise.

Subtenant: a tenant whose parent is another tenant; e.g. the enterprise's financing department.

Default Tenant: the top-level tenant that contains only the default namespace.

Cluster: a physical archive instance, such as described above.

Figure 4:
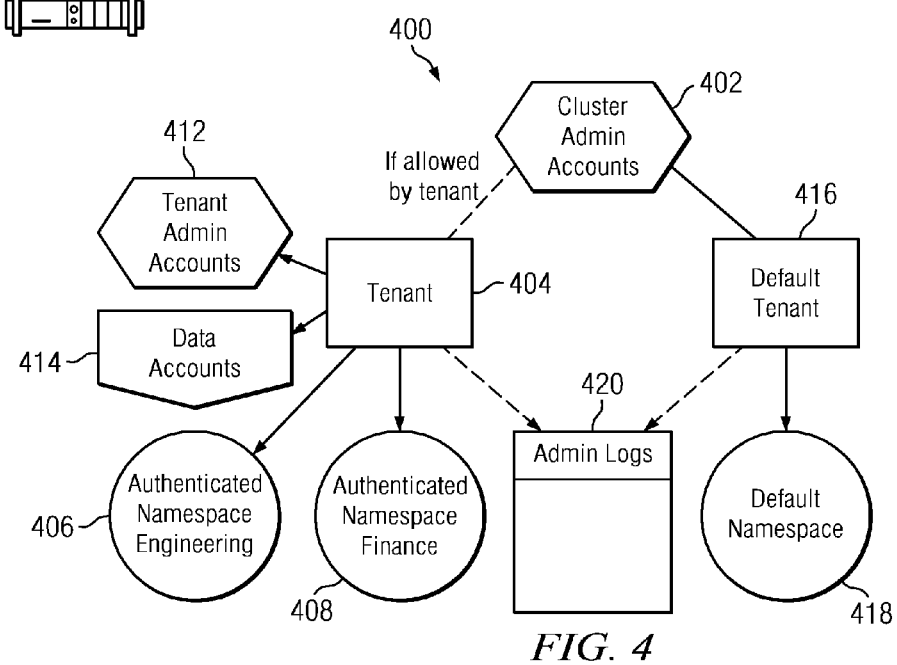
FIG. 4 illustrates how a cluster is partitioned according to the techniques described herein.

When the cluster is freshly installed, it contains no tenants. Cluster administrators create top-level tenants and administrative accounts associated with those top-level tenants, as well as enable the default tenant and default namespace. FIG. 4 illustrates this basic concept. As shown there, there is a cluster instance 400, such as the system illustrated in FIGS. 2-3 and described above. As will be illustrated in more detail below, a cluster administrator has an account 402. An appropriate administrator is given authority to create a top level tenant 404, and one or more namespaces for that TLT, such as first authenticated namespace 406 (for an engineering department) and a second authenticated namespace 408 (for a finance department). An appropriate administrator also sets up administrator accounts 412 and data accounts 414 for the TLT. In addition, an administrator can also enable a default tenant 416 having an associated default namespace 418. Although not shown, authorized administrators may also set up subtenants. The administrator also establishes administrative logs 420. Of course, the above configuration is merely exemplary, as the subject matter herein is not limited to any particular type of use case or tenant/namespace configuration.

At a macro level, all namespaces can be considered as the same or substantially the same entities with the same qualities and capabilities. Generally, and as will be seen, a namespace has a set of associated capabilities that may be enabled or disabled as determined by an appropriately credentialed administrator. A single namespace can host one or more applications, although preferably a namespace is associated with just one defined application (although this is not a limitation). A namespace typically has one or more of the following set of associated capabilities that a namespace administrator can choose to enable or disable for a given data account: read (r)—includes reading files, directory listings, and exists/HEAD operations; write (w); delete (d); purge (p)—allows one to purge all versions of a file; privileged (P)—allows for privileged delete and privileged purge; and search (s).

Using namespaces, and as illustrated generally in FIG. 4, an administrator can create multiple domains for a cluster, which domains differ based upon the perspective of the user/actor. These domains include, for example, the following: access application, cluster admin, TLT admin, subtenant admin, and replication. The domain of the access application is a given namespace. An authorized administrator (such as admin 402) has a view of the cluster as whole. As shown, the administrator 402 can create a top-level tenant and perform all of the administration for actions that have cluster scope. In certain situations, such as enterprise deployments, the tenant may grant appropriate administrators the ability to manage the tenant, in which case any cluster admin also will be able to function as a TLT admin. The TLT admin creates namespaces, data accounts and subtenants. The TLT is able to modify some configuration settings, such as namespace quotas or to enable versioning. The subtenant admin is able to create a namespace under a subtenant. The domain of replication is a set of TLTs defined by the cluster administrator while configuring replication between clusters.

One of ordinary skill in the art will appreciate that a tenant is a logical archive as viewed by an administrator. As shown in FIG. 4, a tenant may represent an organization or a department using a portion of a cluster. A tenant may be implemented as a hierarchy in that it can contain other tenants.

A tenant preferably has a set of attributes: namespaces, administrative accounts, data access accounts, permission mask, roll-up of state, name, and quotas. A tenant may contain zero or more namespaces. A tenant will have a set of administrative accounts (such as account 412) that enable users to monitor and update attributes of the tenant. The data access accounts are the set of accounts which access namespace objects. A permission mask (r/w/d/p/P/s) is the set of permissions global to the tenant and that mask a namespace's permissions. The roll-up of state are the metrics on all namespaces within the tenant. The name of the tenant is settable and changeable by an appropriate administrator. Tenant names within the same cluster must not collide. A top level tenant preferably is assigned a hard storage quota by the administrator. The appropriate admin can lower or raise that quota, and he or she can assign as much quota as desired. The TLT can also specify a soft quota, which is a given percentage of the hard quota. A tenant is able to divide its quota among one or more namespaces, but the total assigned quota may not exceed that of the tenant. For accounting purposes, preferably the quota will measure the rounded up size of an ingested file to the nearest block size. A soft quota is typically a predetermined percentage (e.g., 85%) of a hard quota, but this value may be configurable. Once the hard quota is exceeded, no further writes are allowed, although in-progress writes preferably are not blocked. It may be acceptable to have a delay between exceeding a quota and having future writes blocked. Preferably, quotas are replicated but cannot be changed. When a replica becomes writable, the quota is enforced there as well.

A tenant administrator also has a set of roles that include one or more of the following: a monitor role, an administrator role, a security role, and a compliance role. A monitor role is a read-only version of an administrator role. The administrator role is the primary role associated with a tenant. As described and illustrated above, this role allows an admin user to create namespaces under the current tenant, and it provides a view of all namespaces within this tenant (and associated statistics such as file counts, space available, space used, etc.). The administrator also can view tenant and namespace logs, and he or she can view/update tenant and namespace configuration. The security role gives a user the ability to create/modify/delete new administrative users. A user with the security role can add and delete roles from other tenant-level administrative accounts. When the tenant is first created, preferably there is one administrative user associated with the tenant, and this user account has just the security role. The compliance role enables privileged delete and retention class functions (as defined below).

A namespace is a logical archive as viewed by an application. According to the subject matter herein, a particular namespace is distinct from a different namespace, and access to one namespace does not grant a user access to another namespace. Preferably, administration of a namespace is performed at the owning tenant level. Moreover, preferably a namespace may only be deleted if a count of objects associated with that namespace is zero. A namespace preferably also has the following attributes: permission mask, initial settings, other settings, display name, quota, logs, and stats. As noted above, the permission mask (r/w/d/p/P/s) is the set of settings global to the namespace and which mask an account's permissions. The initial settings identify a data protection level (DPL), a hashing scheme, and the like, that preferably remain persistent. The other settings refer to settings (such as retention, shred, versioning, indexing, and the like) that can be set on the namespace and then later changed. This feature is described in more detail below. The display name is a name or other identifier for the namespace. The quota is either hard (in GB) or soft (in percent). The logs attribute identifies the system events related to the namespace that will be logged. The stats attribute identifies the statistics that are generated from namespace-related data, such as capacity, number of objects, and the like.

Preferably, tenant names and namespace names are human readable identifiers in the various administrative user interfaces (UIs). Preferably, these names also are used in hostnames to specify the namespace of a data access request, the tenant which an administrator is administrating, and the scope over which a search should be confined. The namespace name is useful because a tenant may have more than one namespace associated with it. Preferably, object access over HTTP uses a hostname in the form of:

<namespace-name>.<tenant-name>.<cluster-domain-suffix>

These names comply with conventional domain name system (DNS) standards. As noted above, tenant names on a cluster must not collide.

The following provides additional details of a tenant administrative user interface (UI) and the associated functionality provided by that interface. Preferably, the tenant UI is implemented as a Web-based user interface (such as the interface 318 in FIG. 3), namely, as a tenant administrator console that provides interactive access to an administration engine. The administrative console preferably is a password-protected, Web-based GUI that provides a dynamic view of the archive. Once the tenant administrator has logged into the tenant administrator console, an overview page is provided that presents a main navigation menu. That menu provides access to one or more high level functions (implemented as web pages) such as Overview, Namespaces, Data Access Accounts, Services, Security and Monitoring. Several of these interfaces are now described in more detail.

Figure 5:
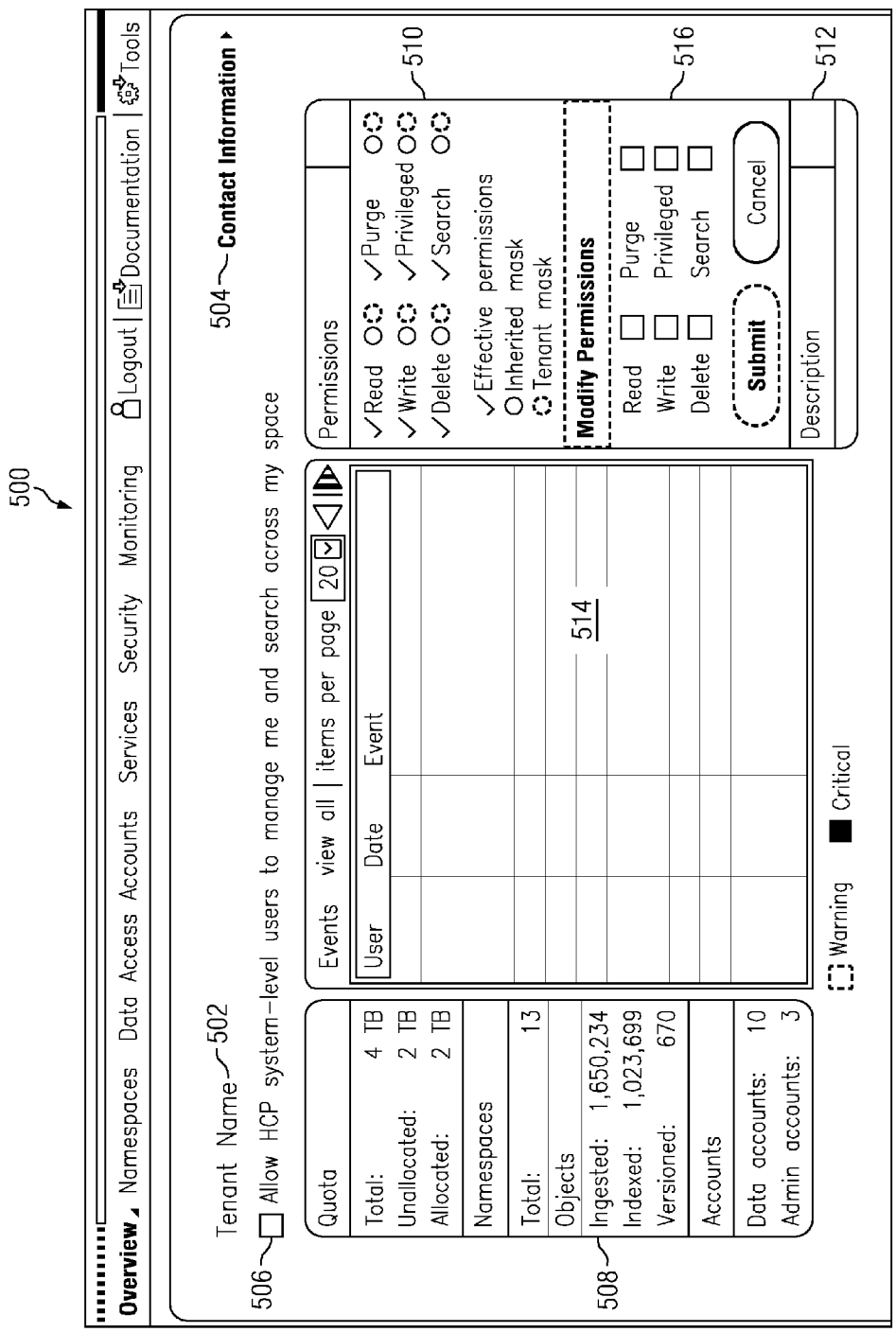
FIG. 5 illustrates an Overview page of a tenant administrator console.

As seen in FIG. 5, the Overview page 500 shows information about the current tenant (i.e., the tenant the administrator logged into), including statistics and major event logs. Typically, the page contains the following information, and preferably this information is not editable: tenant name 502, a link 504 to update the tenant account settings, a checkbox 506 which allows any cluster administrator to also administer this tenant and search over all objects in all namespaces associated with this tenant (provided they have a search role), rolled-up information 508 such as quota (total, unallocated and allocated), namespaces (total number, objects ingested, objected indexed and objects versioned), and accounts (number of data accounts, and number of administer accounts), a permissions menu 510 applied to namespaces owned by the tenant, a tenant description 512, and logs and alerts 514. As illustrated in FIG. 5, the permissions menu identifies the effective permissions (which are checked), and the values of the permissions mask. Because this is the top level, all the settings are shown as inherited and as present in the tenant mask. If the user selects the edit tab, a sub-menu 516 is displayed to enable a permitted administrator to modify the individual permissions. Preferably, the administrator role can modify panels on this page, and the monitor and administrator roles can view the page and panels on the page.

Figure 6:
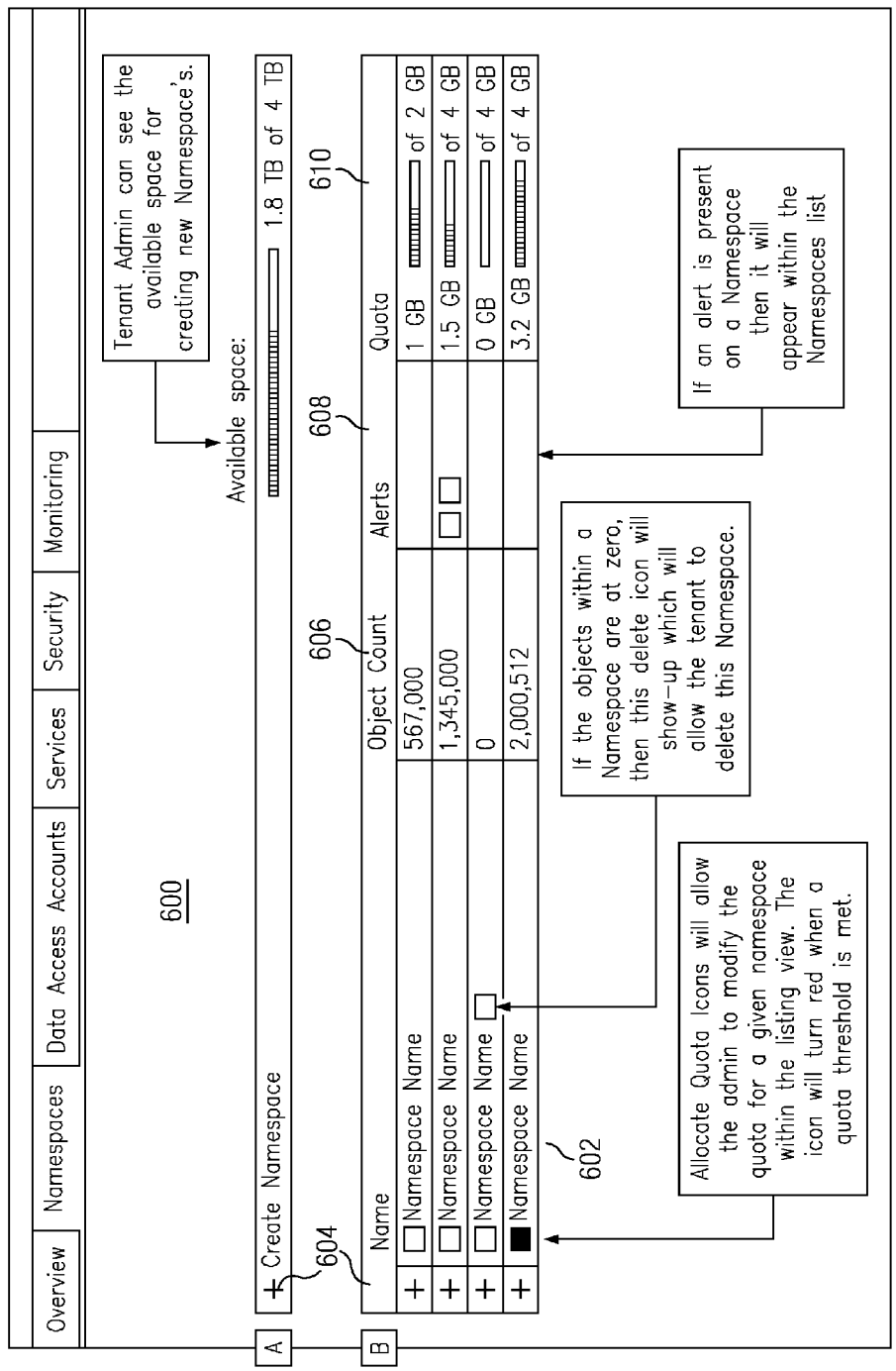
FIG. 6 illustrates a Namespace page of the tenant administrator console.

FIG. 6 illustrates the Namespaces page 600, which lists all namespaces defined directly under this tenant, as well as general statistics about each (object count, any alerts, and quota). This page allows the administrator to drill down for further configuration of a specific namespace. This page is viewable by accounts with the administrator and monitor roles. The page includes a table 602 listing the namespaces owned by the current tenant, and controls (e.g., links/buttons 604) are provided to enable the administrator to create a namespace, view or edit the settings for a listed namespace, or view statistics for a listed namespace. The table includes columns in which statistics and other information for a given namespace, such as object count 606, alerts 608 and quota 610, are displayed in summary form.

Figure 7:
FIG. 7 illustrates a Create Namespace container page of the tenant administrator console.

By selecting the Create Namespace container title bar, the Create Namespace container 700 expands as shown in FIG. 7 to allow a tenant to add a new namespace for the current tenant. To create a new namespace, the user provides the following information: name 702, description 704, maximum size (the hard quota in TB, GB, MB, or the like, for the new namespace) 706, a soft quota (may default to 85%) 708, a DPL value 710 (may default to 1 for external storage, 2 for internal storage), a hash value 712 (may default to SHA-256), a retention mode 714 (enterprise or compliance, defaults to enterprise), object versioning 716 (on/off, defaults to off), and search indexing 718 (on/off, default value is inherited from the tenant). Preferably, the administrator role can view and modify this page. Once the individual parameters for the namespace are configured, the user selects the Create Namespace button 720 to complete the process. In this manner, each individual namespace within a tenant configuration is highly configurable as compared to any other namespace within the tenant. This namespace-by-namespace configurability option provides significant operational and management flexibility.

Figure 8:
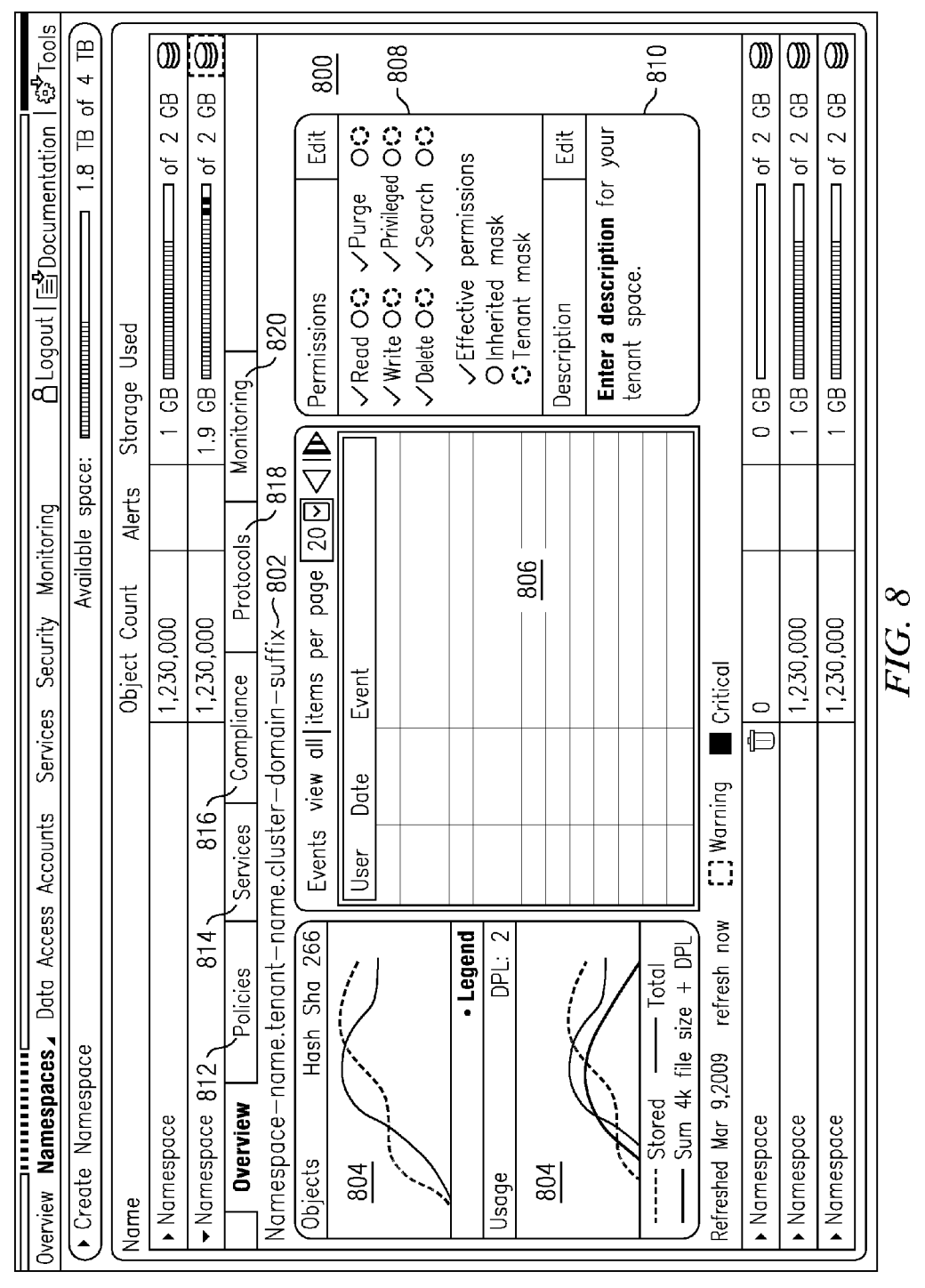

Referring back to FIG. 6, if the user selects any one of the identified Namespaces, a Namespace Overview container 800 expands as shown in FIG. 8, exposing statistics about the selected namespace. These include a field 802 for the namespace name, object and usage graphs 804 (e.g., the objects in namespace, objects indexed, usage such as bytes transferred into namespace, file size sum, and total quota allocated), alerts 806, the permissions menu 808 (showing the permissions mask for this namespace), and a description 810. The monitor and administrator roles can view this page. As also illustrated in FIG. 8, once a given Namespace is selected for configuration, a number of container pages are exposed including a Policies tab 812, a Services tab 814, a Compliance tab 816, a Protocols tab 818, and a Monitoring tab 820. Several of these interfaces are now described in more detail.

If the user selects the Policies tab 812 from the Namespace Overview container 800, a Policies page is displayed from which the user can then configure one or more policies for the particular namespace. In FIG. 9, the user has opened the Policies page 900 and selected a Retention policy title bar, which opens up a container 902 through which the administrator sets a retention policy. If an offset retention method 904 is selected, the administrator sets maximum values (years, months and days). If a fixed date retention method 906 is selected, the user uses the calendar to set a date. If a special values retention method 908 is selected, the user can select from a set of options: deletion allowed, initially unspecified, indefinite and prohibited. If a retention classes method 910 is selected, a set of additional options are exposed, as will be described in more detail below. Once the configuration is made, it is saved by selecting the Update Policy button 912.

Figure 10:
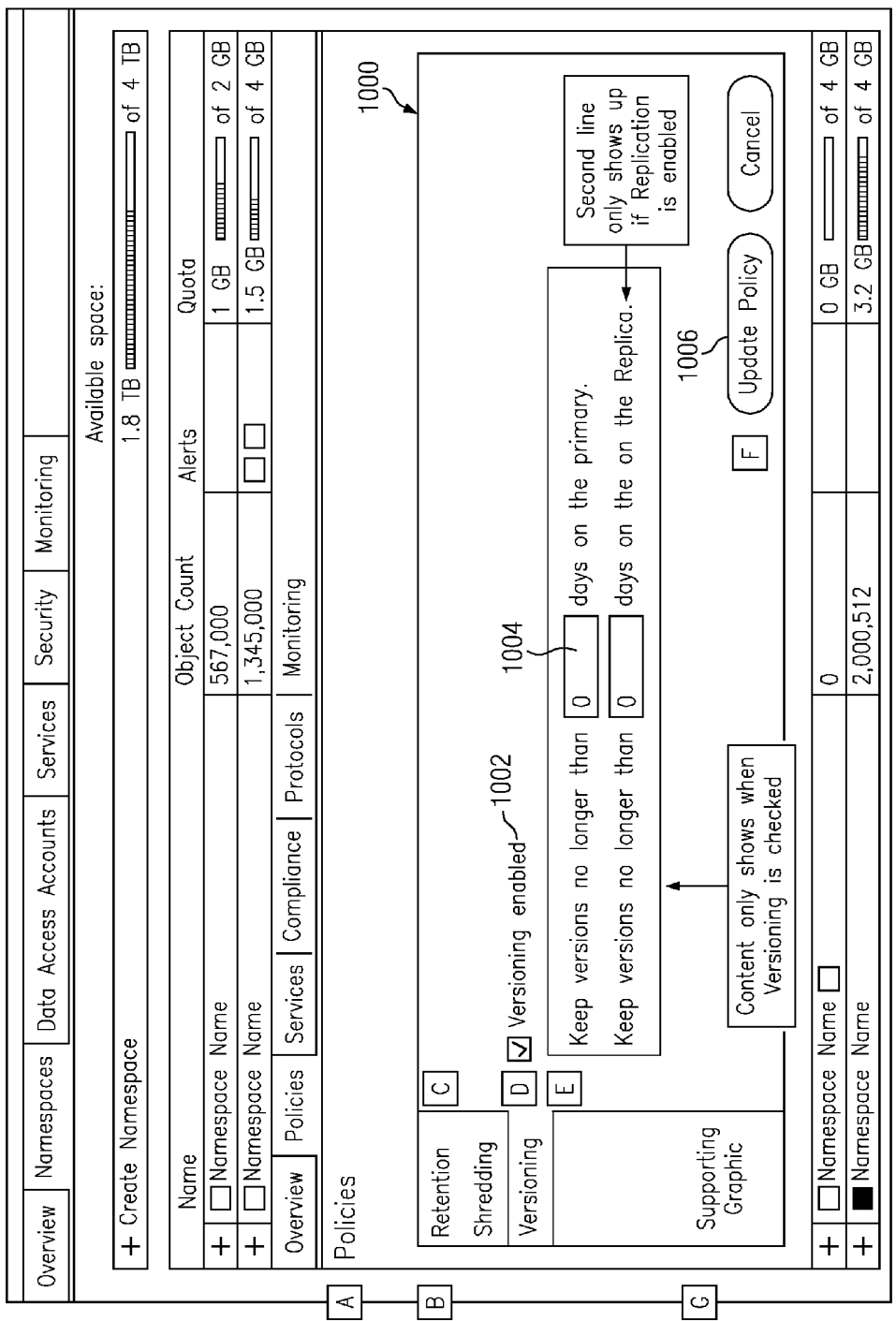
FIG. 10 illustrates how an administrator enables versioning for the namespace.
Figure 11:
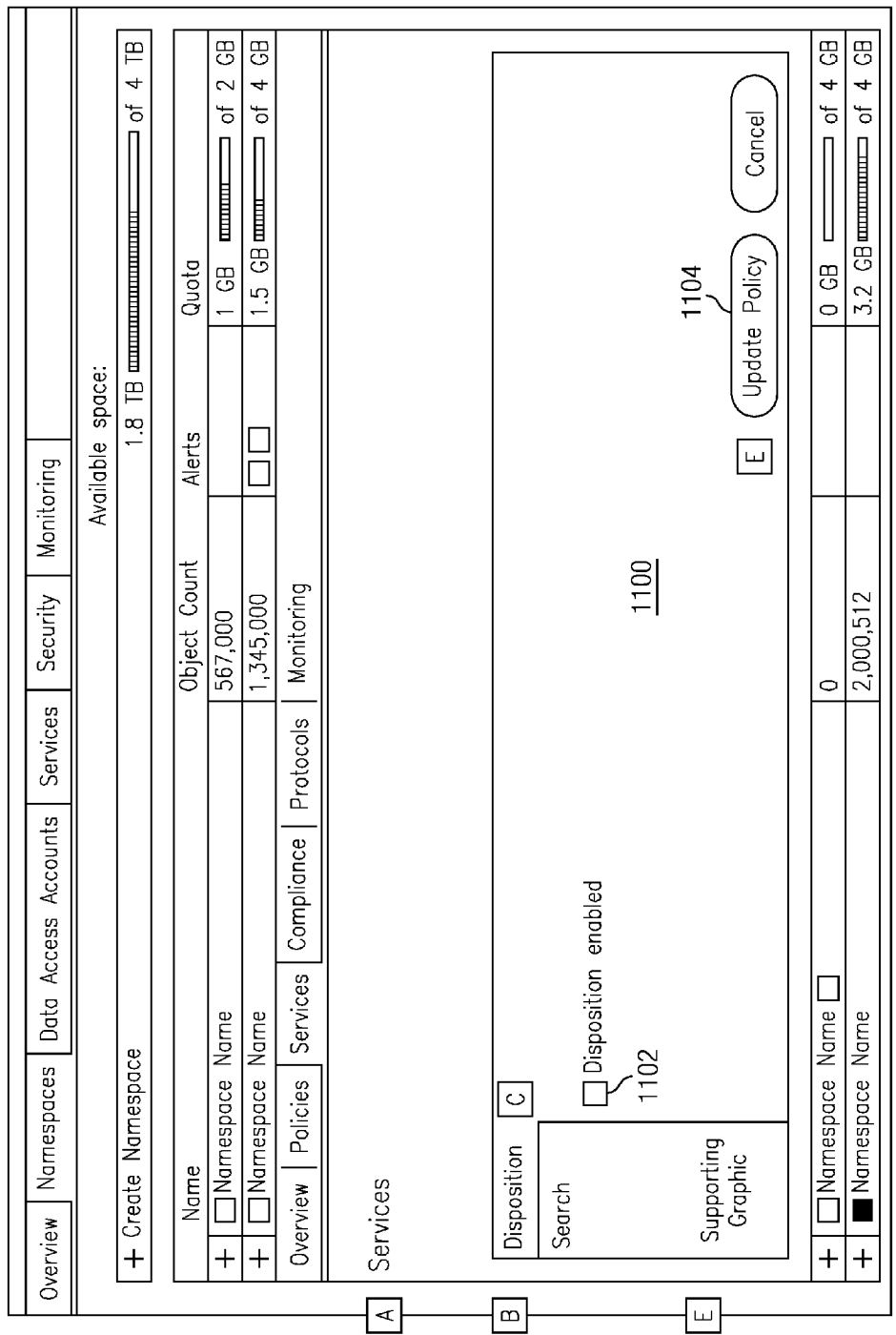
FIG. 11 illustrates how an administrator enables a disposition service for the namespace.

Another configurable policy is versioning. FIG. 10 illustrates a container 1000 with a set of controls that can be used for this purpose. When the container is opened, the user can select a checkbox 1002 to enable versioning for this particular namespace. If this checkbox is selected, the user can then configure (using field 1004) how long the versions are to be kept on the primary cluster and, if replication is enabled, on any replica cluster. This policy is saved by selecting the Update Policy button 1006.

Returning to the description of the administrator console, if the user selects the Services tab 814 for the Namespace, one or more service options may be configured. One such service option is disposition (sometimes referred to as a "disposition service"), which enables automatic deletion of objects with expired retention. The disposition service option is enabled through a panel 1100 that includes a checkbox 1102, which is selected to enable the option for the particular namespace. The user selects the Update Services button 1104 to complete the configuration. Thus, according to the configuration option, once the configured retention (e.g., identified in the retention class) expires, the objects associated with that retention class (for this namespace only) are automatically deleted from the cluster. This operation is advantageous as it enables the cluster to reclaim storage space. The disposition service, however, is on a namespace-by-namespace basis, which is highly desirable and provides increased management flexibility.

Figure 12:
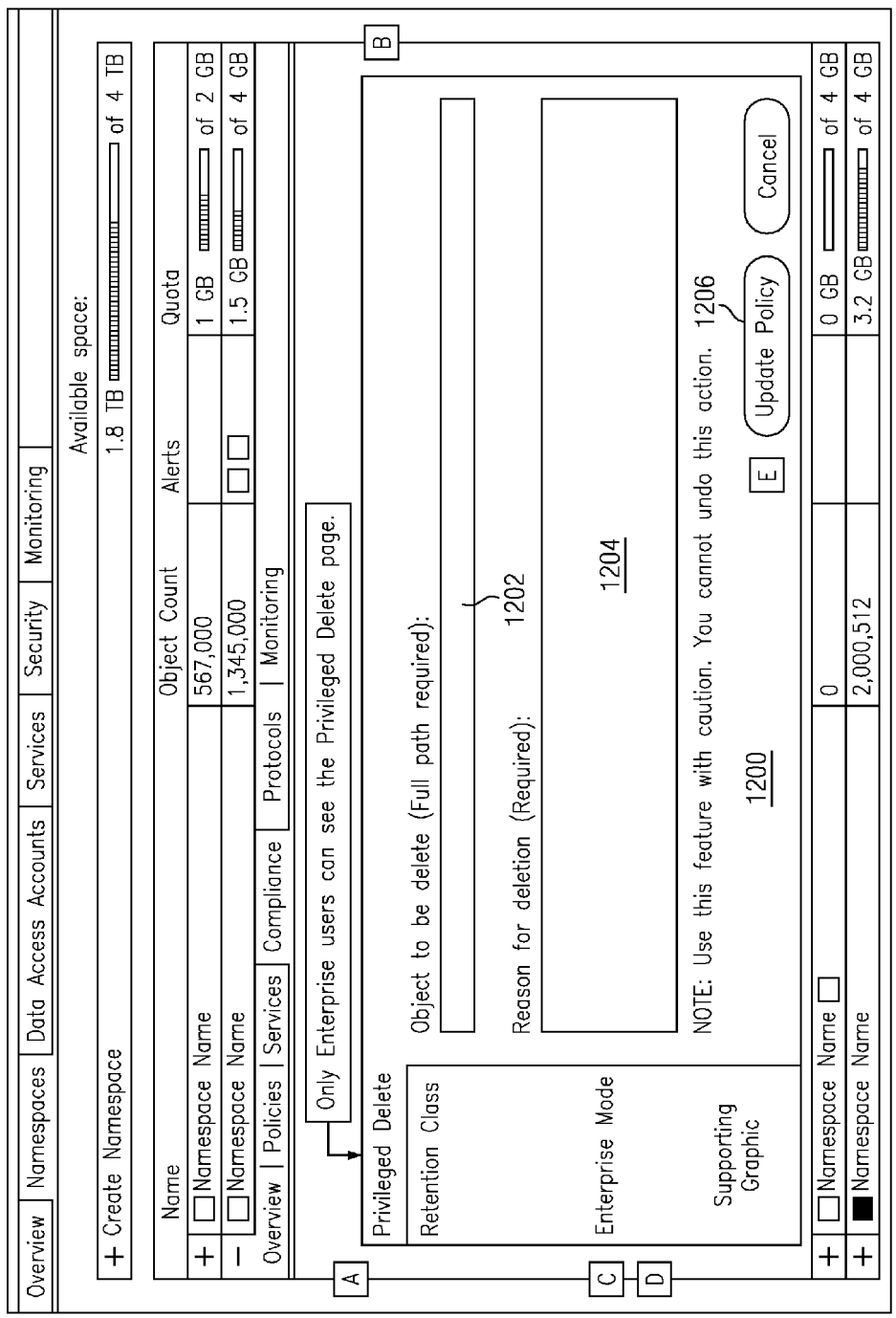
FIG. 12 illustrates how an administrator enables a privileged delete option for the namespace.

If the user selects the Compliance tab 816 for the Namespace, one or more compliance options may be configured. In FIG. 12, the user has selected a Privileged Delete compliance option, by which the user can identify for deletion a particular object and provide reasons for this deletion. As shown, the Privileged Delete panel 1200 includes a field 1202 in which the object to be deleted is identified (preferably by its full path), as well as a description 1204 field indicating the reason for deletion. By selecting the Delete This Object button 1206, the object is then permanently deleted from the cluster. Preferably, this feature is only enabled for an enterprise mode of operation. The Privileged Delete function enables the user to remove all versions of an object, even if the object is under retention.

Figure 13:
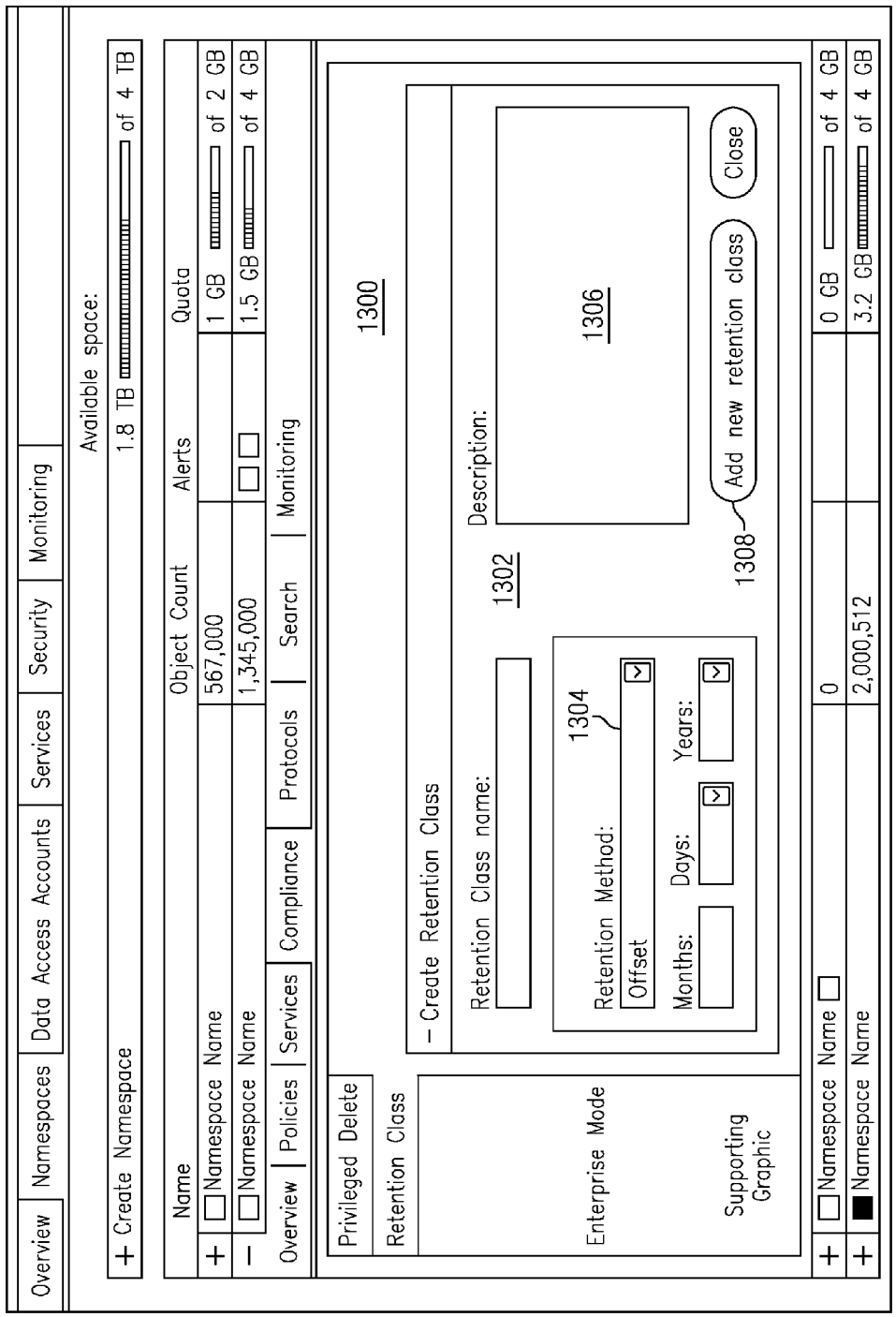
FIG. 13 illustrates how an administrator enables retention classes for the namespace.

Another configurable option in the Compliance tab 816 for the Namespace is the option to configure one or more Retention Classes. A Retention Class is a defined grouping of objects that are to be subject to the same retention configuration. When the user navigates to the Retention Classes tab, a set of previously-defined Retention Classes and their values are displayed and can be selected for review. To add a new retention class, the user selects a title bar, which opens up the container 1300 shown in FIG. 13. Using this panel, the user can identify the new retention class name using field 1302, select the retention method by menu 1304, and add a description in field 1306. The retention method menu 1304 exposes the retention options (years, months, and days) previously described. The Add new retention class button 1308 is used to configure the new class.

Figure 14:
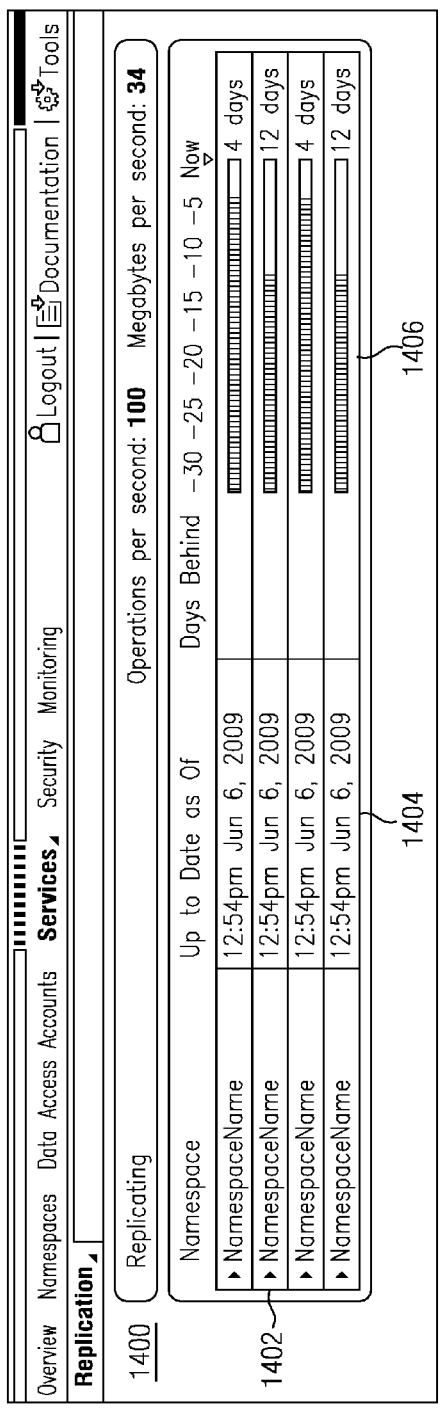
FIG. 14 illustrates a Replication tab for the tenant.
Figure 15:
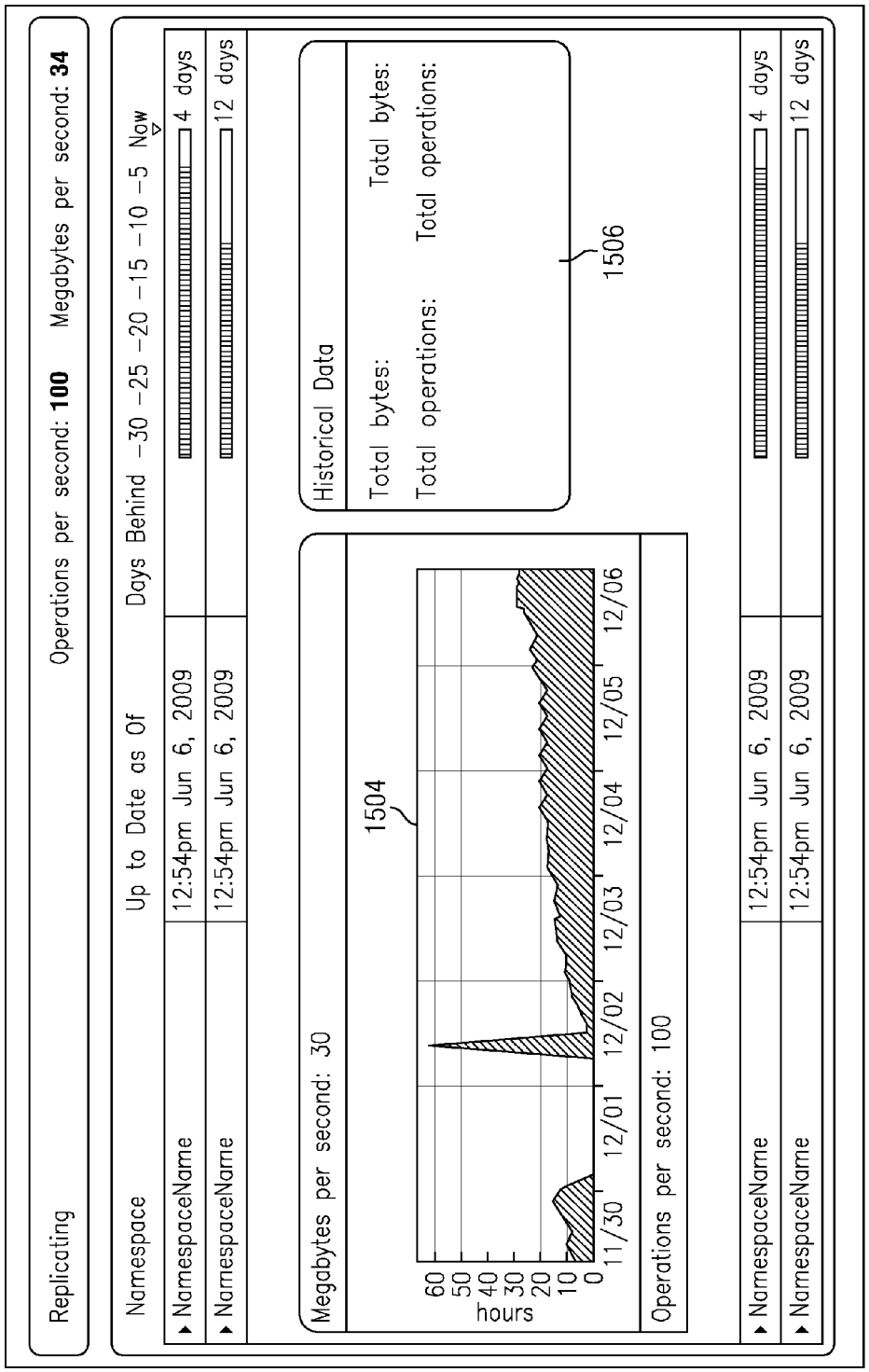
FIG. 15 illustrates one of the Namespaces in the Replication tab showing the graphs and statistics for the replication of that namespace.

If replication is enabled for the tenant, the administrator console will provide a display of graphs and statistics, preferably on a per-namespace level. FIG. 14 illustrates a representative UI page 1400 when Replication is selected from the main Services tab. The page lists each Namespace that has been configured for the tenant, such as Namespace 1402. Data in a column 1404 indicates the up-to-date status of the replica (meaning all objects are replicated as of this date and time), and data in a "Day's Behind" graphic 1406 indicates how far behind the replica is relative to the primary. When the user selects any one of the identified Namespaces, such as 1402, a Namespace Overview container 1500 expands as shown in FIG. 15, exposing more detailed graphs and statistics about the selected namespace. The graph 1504 illustrates the data transfer rate and chart 1506 illustrates summary historical data.

Data at a tenant level is replicated for tenants configured for replication. In the event of a disaster or other issue at the primary cluster, all of the archive configuration settings can be restored for the tenant from the replica.

Figure 18:
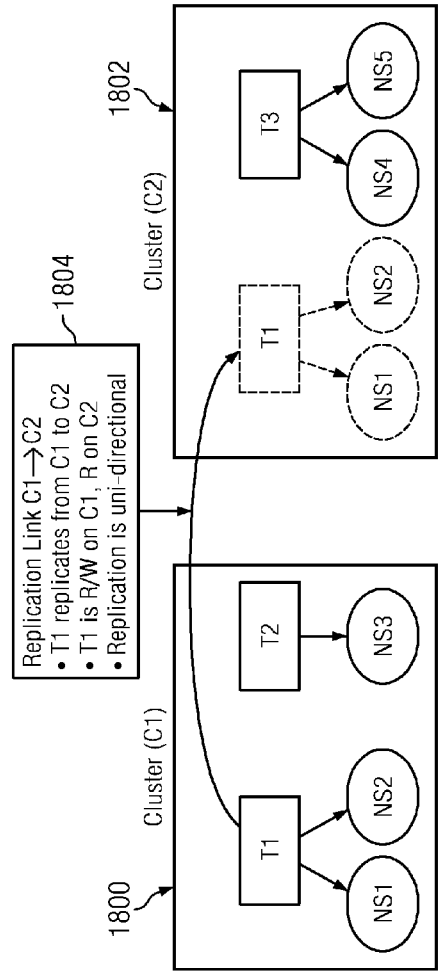
FIG. 18 illustrates how tenant data is replicated according to the subject matter of this disclosure.

FIG. 18 illustrates the basic concept of replication as applied to tenants and namespaces. As illustrated, there is a primary cluster 1800 and at least one replica 1802. The link 1804 has been established between the clusters. Primary cluster 1800 has two configured tenants T1 and T2, and tenant T1 has two namespaces NS1 and NS2, which have been configured in the manner previously described and illustrated. Tenant T2 has one namespace, NS3. Cluster 1802 includes configured tenant T3, having two namespaces NS4 and NS5, as shown. According to this disclosure, the tenant T1 and its associated namespaces has been replicated over link 1804 that has been established between cluster 1800 and cluster 1802. The replica is indicated in dashed form in cluster 1802. The tenant T1 is read/write on cluster 1800, but read-only on the replica cluster 1802. Preferably, replication over the link 1804 is uni-directional, and information is replicated in one direction at a time (i.e. the entire link either is replicating from source to replica, or restoring in the opposite direction). Generally, the replication link replicates at least some tenant information from the source cluster to the replica cluster.

The information to be replicated includes accounts for tenants and their associated namespaces. In a typical implementation, the following items may be selected for replication over a particular replication link: any number of top level directories from the default namespace, and any number of top level tenants. If a tenant is selected, preferably all associated information will be replicated, namely: tenant admin accounts, tenant data accounts, tenant admin logs, tenant configuration information (including their retention class definitions), all associated namespaces and their data, and all associated namespace logs (including compliance logs), and so forth. Preferably, replication metrics are provided (in the UI) for both the replication link and individual namespaces within it. One or more of these metrics may be available for the replication link: total bytes replicated (ever), total bytes restored (ever), number of operations replicated (ever), number of operations restored (ever), current bytes per second transfer rate, current operations per second rate, current errors per second rate, greatest replication backlog time (for whichever namespace is farthest behind), average replication backlog time (averaged across all replicated namespaces), and smallest replication backlog time. Preferably, one or more of the following metrics are viewable for each replicated namespace: total bytes replicated (ever), total bytes restored (ever), current bytes per second transfer rate, current operations per second rate, current errors per second rate, and replication backlog time.

There may be one or more replication links per tenant or namespace. A particular cluster may have one or more outbound links (to one or more replica clusters), and one or more inbound links (from one or more replica clusters). If multiple links are supported, one tenant can be replicated to different clusters, and replication links with different characteristics or quality-of-service (QoS) may be implemented. In such a multi-link implementation, a tenant can replicate its namespaces over different replication links based on the link characteristics (static or dynamic).

In a typical use case, such as shown in FIG. 18, the replica tenant T1 in cluster 1802 is read-only (although this is not a limitation). As a consequence, no configuration change may be made by any tenant administrator logged into the replica tenant, and no deletes or purges may be made by any data access account to any namespace associated with the replica tenant. Likewise, while a data account (a user) with a search privilege may log in to the search UI on the replica and issue a query, however, the user may not do any update action, such as delete, hold, purge, privilege delete, or save the results of the query.

Preferably, there are one or more exceptions to this read-only restriction for system events on the replica, and administrative and data accounts on the replica. System events specific to the replicated tenant and associated namespaces cause writes to administrative logs. Thus, actions such as logging into the replica tenant admin UI are logged on the replica as a system event, and certain events (e.g., irreparable file found) logged in a replica's namespace are also logged in the replica's system events. Moreover, if a tenant admin fails a consecutive login check on the replica, his or her account may be disabled on the replica. Similarly, if a data account fails a consecutive authentication check on the replica, the account is disabled on the replica. Because all configuration (including admin and data accounts) preferably is read-only on the replica, the procedure for re-enabling these accounts on the replica preferably is as follows: on the source cluster, disable account; re-enable the account; and wait for the account to be replicated. The update on the source is then propagated to the replica, and the account on the replica becomes enabled.

To allow for a new tenant to be added to the replication link without stalling the progress of other tenants, the following replication algorithm is implemented. By way of background, a replication algorithm can be visualized as a series of loops (over time, and region) culminating in a query for all objects that changed in a certain time range on a specific region. This approach is modified as follows: loop over each region, performing a certain amount of work, until all objects are replicated within a requested time interval. There is no requirement that each region (or namespace within a region) be synchronized with respect to any lower bound of its change time. A "content collector" (such as a Tenant content collector, an AdminLog content collector) work entity is then defined. The content collector for namespaces preferably is region-based in that it must further subdivide its work among multiple regions of the cluster. The flow control then works as follows:

While there are intervals left:
1. Define the current time interval:
2. For each content collector:
   1. Replicate eligible content for the given time interval
3. If the content collector is region-based:
   1. For each region:
      1. For each namespace to be replicated:
         1. Replicate eligible objects within time interval The last step (replicating all eligible objects within the time interval) is done up to a "unit of work." Because the number of objects to replicate in a time window may be large, the amount of work done may be limited if desired, e.g., by capping the "amount of work" done for each namespace (e.g., the number of objects replicated, the quantity of bytes replicated, or some other measure).

The approach described above is beneficial because it enables a tenant or namespace to be added to an existing replication link without interfering with the progress of other objects on the link. Tenants and namespaces can be replicated with varying QoS levels, as described, and replication of an individual namespace can be paused without affecting other tenants. Further, by structuring the database appropriately, the replication algorithm also can do fine-grained work among different object types. The technique enables rotation among the namespaces at a fairly granular level so that replication of objects across namespaces appears uniform.

The replication techniques described herein can be expanded to include other types of data (beyond tenant and namespace data), such as administrative and account data, administrative logs, retention classes, database configurations and objects, and the like.

The replication logic preferably processes changes on a region-specific basis within the cluster. The replication logic thus may query and generate changes for the following types of information: tenant and namespace-specific admin logs, tenant admin accounts, tenant data accounts, tenant configuration, and namespace configuration. A query gathers matching records for each of these types of data.

Although not illustrated in detail, the other display panels expose other configuration options that may be used to configure operations and functions on a namespace-specific basis. Thus, Protocols tab 818 enables the administrator to manage protocol settings, such as enabling HTTP, HTTPS, and to create white/block lists of IP addresses. The Monitoring tab 820 enables the administrator to identify or review system log messages that are specific to the namespace, to review object status, and to illustrate privileged delete and retention class activities.

The administrator can also create and manage data access accounts from pages in the console and have these configuration settings applied to all namespaces for which the tenant is currently logged into. For each such data access account, the administrator can associate the desired access rights (e.g., read, write, delete, purge, search, etc.) that will be afforded the individual.

If the namespace is authenticated, the following additional controls may be imposed. Preferably, access to archive objects in an authenticated namespace is carried out through HTTP and subject to valid credentials. A client must supply these credentials to the cluster, typically using Cookie and Host headers on each HTTP operation. The necessary information required to map a client request to a specific data access account in a namespace includes username, password, and a fully qualified namespace name (FQNN). The FQNN identifies the namespace within a tenant hierarchy, and it is based on the namespace name, the tenant name, and a tenant's parent name (if any). REST access methods preferably are used for object actions (object ingestion, object retrieval, object existence checks, object deletion, object purge, directory listing, and directory creation), and metadata actions (set retention, set legal hold, set shred on delete, set/get/delete custom metadata, get all metadata). As is known, REST (Representational State Transfer) is a lightweight protocol commonly used for exchanging structured data and type information on the Web. Transport layer security mechanisms, such as HTTP over TLS (Transport Layer Security), may be used to secure messages between two adjacent nodes. Familiarity with these technologies and standards is presumed.

By partitioning the UI into cluster and tenant-focused pieces, different people can perform cluster and tenant management. This ensures that privacy between the cluster admin and tenant admin views is enforced, ensures that the tenant does not have access to hardware or other details that may "break" the cluster, and protects the privacy of tenant data.

The subject matter described herein provides numerous advantages. Using the namespaces approach described, an entity (such as an enterprise operating the archive) can more easily segregate and manage its data. The approach enables the administrator to perform cluster operations on select subsets of the total cluster data set, as well as the ability to perform metering operations (e.g., capacity reporting) at a finer granularity. The ability to partition the cluster in the manner described provides significant operational, management and administrative efficiencies, as the ever-increasing (e.g., petabyte scale) data would be difficult to manage otherwise.

The described subject matter enables different administrators to perform cluster and tenant management, and to minimize the information that passes between these two areas.

The subject matter is not limited to any particular type of use case. A typical use environment is an enterprise, although the techniques may be implemented by a storage service provider or an entity that operates a storage cloud.

The techniques described herein, wherein users associated with a tenant (such as a TLT) have access privileges created and managed as set forth above may be extended and used in other than an archive cluster for fixed content. Thus, for example, these techniques may also be implemented in the context of a standard virtualization approach for a storage management system.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

As used herein, the word "location" is not necessarily limited to a "geographic" location. While clusters are typically separated geographically, this is not a requirement. A primary cluster may be located in one data center in a city, while the replica cluster is located in another data center in the same center. The two clusters may also be in different locations within a single data center.

Although the present invention has been described in the context of an archive for "fixed content," this is not a limitation either. The techniques described herein may be applied equally to storage systems that allow append and replace type modifications to the content.

The replication techniques described herein may be extended. Thus, for example, the techniques may be used in the context of network attached storage (NAS) for the purpose of replicating key information from NAS virtual servers or application containers to the content platform. This would allow one NAS system to read the information from another NAS system to enable reconstitution of NAS system configuration data. This approach can also be extended to the objects and files sent to the content platform from the NAS system components.

Having described the invention, what we now claim is as follows.

The invention claimed is:

1. A method operative in a first storage system including a first processor and a first storage device storing a program executed by the first processor, a second storage system, including a second processor and a second storage device, that is coupled to the first storage system, the method comprising:
managing a plurality of tenants, which are logical partitions of the first storage system, each of the tenants is associated with a plurality of namespaces;
enabling replication of a first tenant of the plurality of tenants in the first storage system; and
replicating information regarding the first tenant and a plurality of first namespaces associated with the first tenant to the second storage system.

2. A method according to claim 1, further comprising:
replicating to the second storage system an administrative account that enables users to manage a configuration of the first tenant.

3. A method according to claim 1, further comprising:
replicating log information of the plurality of namespaces associated with the first tenant.

4. A method according to claim 3, wherein the log information includes compliance log information.

5. A method according to claim 1, further comprising:
providing the information regarding the first tenant in the second storage system as a read-only tenant to a client.

6. A method according to claim 1, further comprising:
in the second storage system, prohibiting deletion of one or more of the plurality of replicated namespaces associated with the first tenant or changing a configuration of the first tenant.

7. A method according to claim 1, further comprising:
configuring a link between the first storage system and the second storage system to facilitate the replicating step.

8. A method according to claim 1, wherein the first storage system is a primary storage system and the second storage system is a replica storage system.

9. A system, comprising:
one or more first nodes that configure a first cluster and each include a first processor, and a first storage device storing a program executed by the first processor; and
one or more second nodes that configure a second cluster and each include a second processor, and a second storage device storing a program executed by the second processor;
wherein the program, when executed by the first processor, causes the first processor to:
manage a plurality of tenants, which are logical partitions of the first cluster, each of the tenants is associated with a plurality of namespaces,
enable replication for a first tenant in the plurality of tenants in the first cluster, and
replicate information regarding the first tenant and a plurality of first namespaces associated with the first tenant to the second cluster.

10. The system according to claim 9, wherein the first cluster is configured to replicate to the second cluster an administrative account that enables users to manage a configuration of the first tenant.

11. The system according to claim 9, wherein the first cluster is configured to replicate log information of the plurality of namespaces associated with the first tenant.

12. The system according to claim 11, wherein the log information includes compliance log information.

13. The system according to claim 9, wherein the second cluster is configured to provide the information regarding the first tenant in the second cluster as a read-only tenant to a client.

14. The system according to claim 9, wherein the second cluster is configured to prohibit deletion of one or more of the plurality of replicated namespaces associated with the first tenant or changing a configuration of the first tenant.

15. The system according to claim 9, wherein the first cluster and the second cluster are configured to set a link between the first cluster and the second cluster to enable the replication of the information regarding the first tenant and the plurality of the first namespaces associated with the first tenant from the first cluster to the second cluster.

16. The system according to claim 9, wherein the first cluster is a primary cluster and the second cluster is a replica cluster.

17. A first system, which is coupled to a second system, comprising:
a first processor; and
a first memory storing a program executed by the first processor,
wherein execution of the program causes the first processor to:
manage a plurality of tenants which are logical partitions of the first system, each of the tenants is associated with a plurality of namespaces;
enable replication for a first tenant in the plurality of tenants in the first system, and
replicate information regarding the first tenant and a plurality of first namespaces associated with the first tenant to the second system.

18. The system according to claim 17, wherein the first cluster is configured to replicate to the second cluster an administrative account that enables users to manage a configuration of the first tenant.

19. The system according to claim 17, wherein the first cluster is configured to replicate log information of the plurality of namespaces associated with the first tenant.

20. The system according to claim 19, wherein the log information includes compliance log information.

21. The system according to claim 17, wherein the second cluster is configured to provide the information regarding the first tenant in the second cluster as a read-only tenant to a client.

22. The system according to claim 17, wherein the second cluster is configured to prohibit deletion of one or more of the plurality of replicated namespaces associated with the first tenant or changing a configuration of the first tenant.

23. The system according to claim 17, wherein the first cluster and the second cluster are configured to set a link between the first cluster and the second cluster to enable the replication of the information regarding the first tenant and the plurality of the first namespaces associated with the first tenant from the first cluster to the second cluster.

24. The system according to claim 17, wherein the first cluster is a primary cluster and the second cluster is a replica cluster.

\* \* \* \* \*